United States Patent
Lovett

(10) Patent No.: US 7,255,252 B2
(45) Date of Patent: Aug. 14, 2007

(54) MOTORCYCLE BAG

(76) Inventor: Terry Lovett, 4050 W. Chandler Ave., Santa Ana, CA (US) 92704

( * ) Notice: Subject to any disclaimer, the term of this patent is extended or adjusted under 35 U.S.C. 154(b) by 547 days.

(21) Appl. No.: 10/137,182

(22) Filed: Apr. 26, 2002

(65) Prior Publication Data

US 2003/0201292 A1    Oct. 30, 2003

(51) Int. Cl.
*A45F 4/00* (2006.01)
(52) U.S. Cl. .................. 224/585; 224/275; 224/413; 224/427; 224/652
(58) Field of Classification Search ........... 150/154, 150/158; 224/412, 413, 415, 417, 584; 190/108
See application file for complete search history.

(56) References Cited

U.S. PATENT DOCUMENTS

| 1,860,204 | A | * | 5/1932 | Roberts | 224/42.32 |
| 5,402,869 | A | * | 4/1995 | Saltzman et al. | 190/108 |
| 5,544,792 | A | * | 8/1996 | Arnwine | 224/153 |
| 5,788,032 | A | * | 8/1998 | Krulik | 190/108 |
| 6,012,557 | A | * | 1/2000 | Derelanko | 190/108 |
| 6,109,402 | A | * | 8/2000 | Godshaw et al. | 190/108 |
| 6,123,239 | A | * | 9/2000 | Lovitt | 224/413 |
| 6,193,118 | B1 | * | 2/2001 | Kearl | 224/153 |
| 6,279,796 | B1 | * | 8/2001 | Trevino | 224/153 |
| 6,502,951 | B2 | * | 1/2003 | Marshall | 362/156 |
| 6,547,114 | B2 | * | 4/2003 | Smith | 224/413 |
| 2002/0113102 | A1 | * | 8/2002 | Klamm | 224/153 |

* cited by examiner

*Primary Examiner*—Tri M. Mai
(74) *Attorney, Agent, or Firm*—Knobbe, Martens, Olson & Bear LLP

(57) ABSTRACT

A motorcycle bag is provided having an adjustable enclosure for securing the motorcycle bag to a sissy bar of a motorcycle. Using layers of various sized panels, including a panel that can be expanded using closure means such as a pair of zippers, discreet sized closed loops are formed to fit over different sized motorcycle sissy bars. By expanding the adjustable panel, more sizes are available to the user providing a plurality of options for fitting the motorcycle bag onto different motorcycles. The motorcycle bag preferably includes a protective covering tethered to the bag within a storage compartment that may be withdrawn to cover and insulate the motorcycle bag from moisture, rain, and wind during travel in inclement weather. The motorcycle bag further preferably includes an organizer for storing various travel items and hide-away arm straps for carrying the motorcycle bag like a backpack when the motorcycle bag is not affixed to a motorcycle.

10 Claims, 3 Drawing Sheets

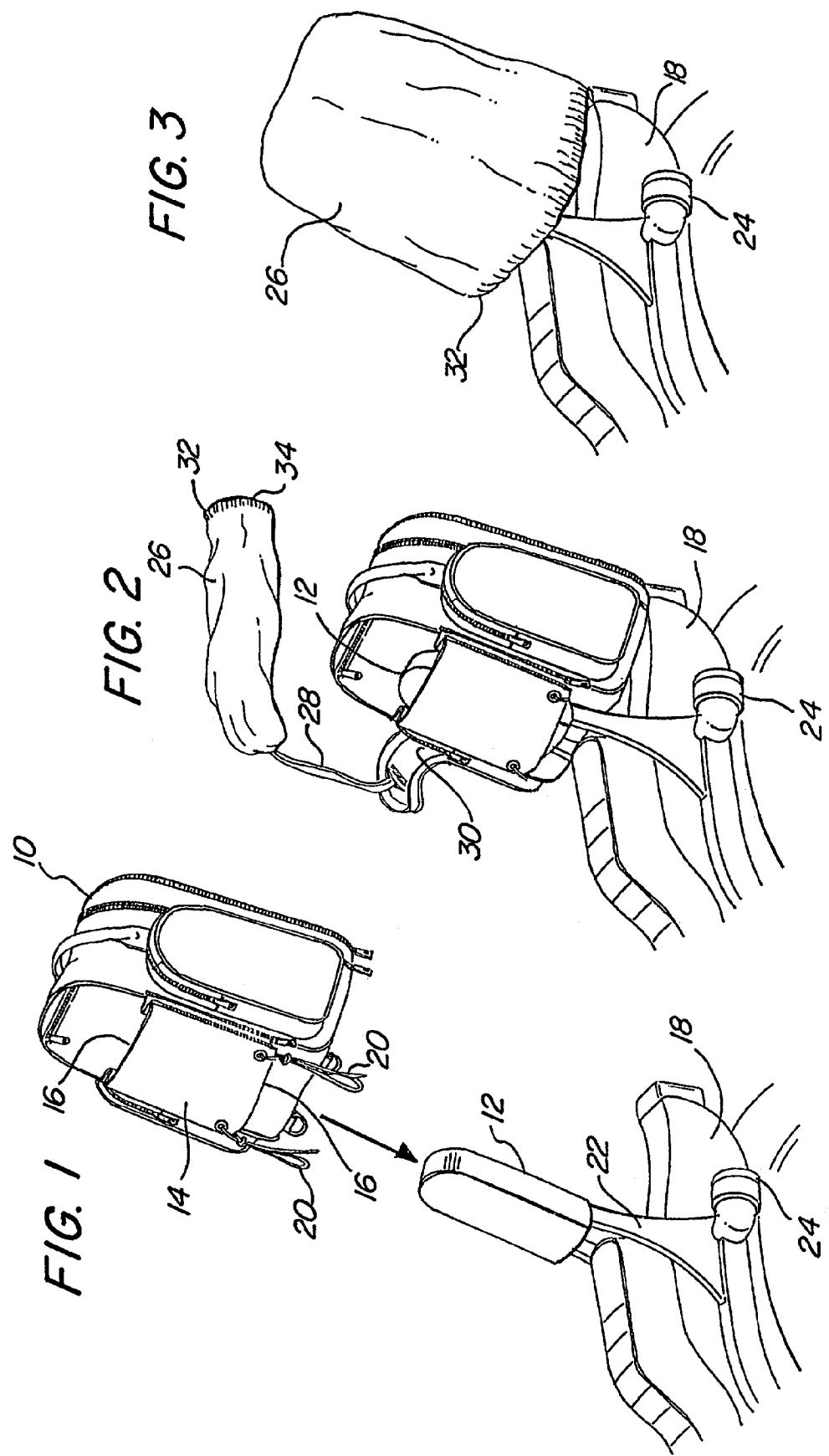

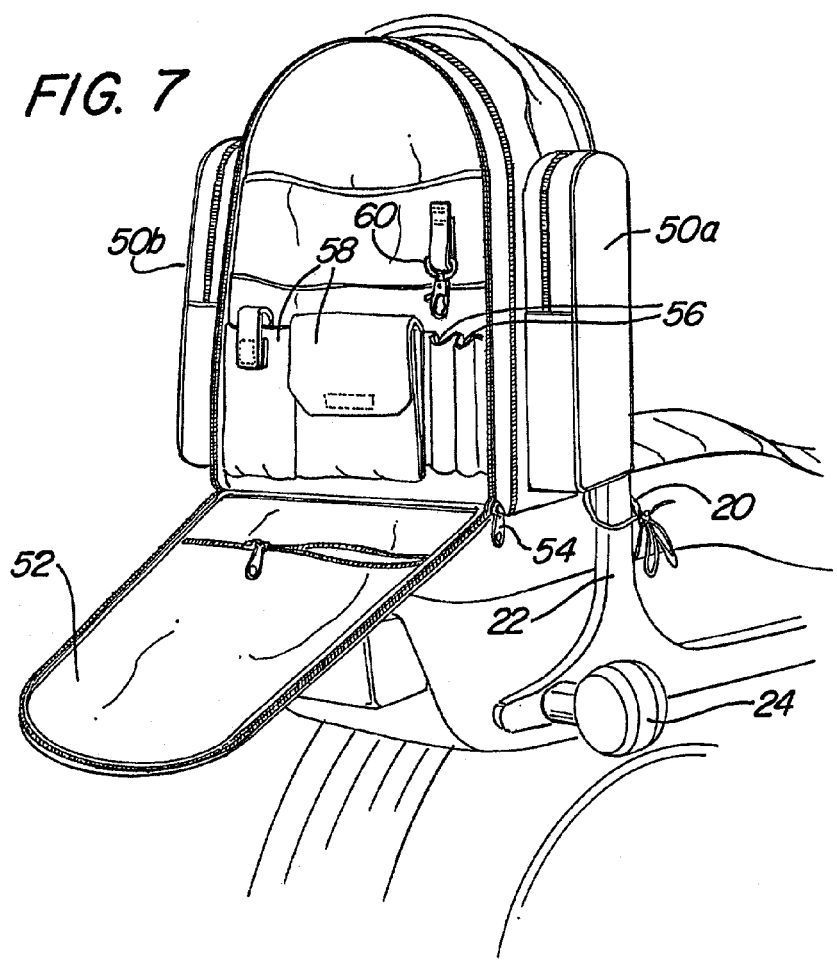
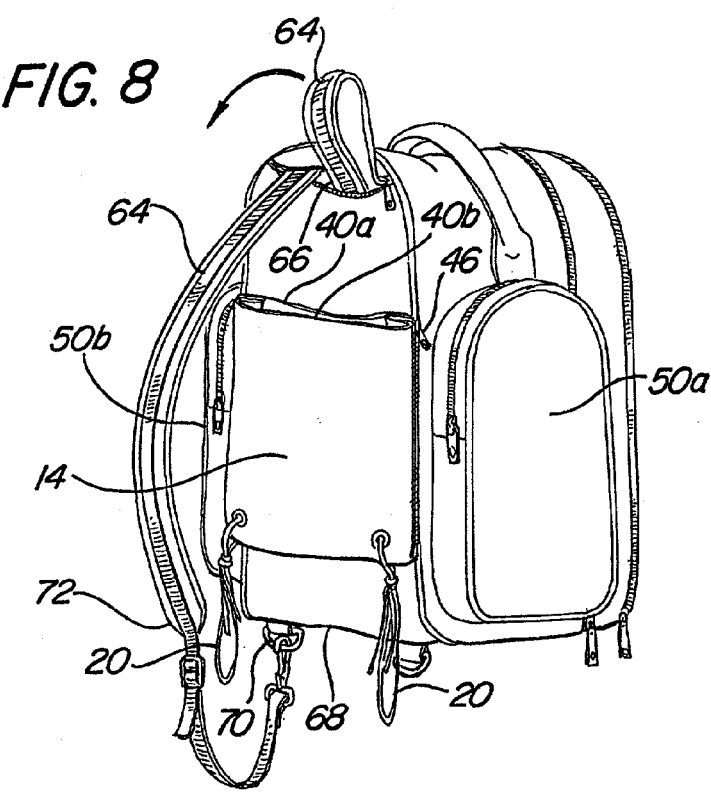

US 7,255,252 B2

MOTORCYCLE BAG

BACKGROUND OF THE INVENTION

1. Field of the Invention

The present invention relates generally to travel bags, and more particularly to a travel bag adapted to be secured to a motorcycle.

2. Description of Related Art

Backpacks were once the travel accessory of choice of the motorcycle rider. Since there is very little cargo capability on many motorcycles, backpacks were convenient because they could be worn on the rider's back freeing both hands for steering. To the motorcycle rider, the backpack substituted for the trunk, glove box, backseat, and various other storage compartments enjoyed by the driver of a four-wheeled vehicle. Backpacks, however, are ill suited for carrying documents and various items such as phones, pens, calculators, etc. because they lack rudimentary organizational features. Moreover, because the backpacks may be loaded with an assortment of items on a long journey, backpacks can become heavy and uncomfortable on longer motorcycle rides. Thus, many motorcycle riders tried to tie the backpack to the motorcycle itself and thereby relieve the rider of the burden of carrying the backpack while driving. A common and convenient place to secure the backpack was to the sissy bar, a seat back found on most motorcycles that serves as a back rest for a passenger, or in some cases the rider. Using elastic cords, twine, or rope, riders secured their backpack to the sissy bar to avoid wearing the backpacks while driving. Eventually, the motorcycle bag became a separate device designed specifically to be secured to the motorcycle.

Today, motorcycle bags are used as a common storage and travel companion of the motorcycle rider. However, motorcycle bags still resemble backpacks in their lack of sophistication and adaptability. The art lacks a convenient and adaptable method of securing a motorcycle bag to various motorcycles. The present invention solves a longstanding need for a motorcycle bag that is adaptable to various size motorcycle sissy bars, to changing environmental conditions, and further provides for the needs of the business person/motorcycle rider.

SUMMARY OF THE INVENTION

The present invention is directed to a motorcycle bag with a variable enclosure for securing the motorcycle bag to a sissy bar of a motorcycle. The variable enclosure can be selectively enlarged or contracted to obtain a proper adjustment, where the sissy bar fits through the variable enclosure leaving the motorcycle bag supported thereon. A separate and alternate feature of the present invention is the presence of a protective covering tethered to the bag for use in inclement weather, with a storage compartment for storing the protective covering when not in use. The present invention preferably includes hide-away arm straps that allow the motorcycle bag to be used as a backpack when not secured to the motorcycle.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof and wherein:

FIG. 1 is an elevated perspective view of a preferred embodiment of the present invention showing its cooperation with a motorcycle sissy bar for securing the present invention thereto;

FIG. 2 is an elevated perspective view of a preferred embodiment of the present invention disposed on a motorcycle sissy bar with a tethered protective covering and compartment for storing same;

FIG. 3 is an elevated perspective view of a preferred embodiment of the present invention with the protective covering of FIG. 2 disposed over the motorcycle bag;

FIG. 7 is an elevated perspective view of a preferred embodiment of the present invention secured to a motorcycle illustrating various organizational component for holding documents, writing instruments, keys, cell phones, electronic devices, and the like; and FIG. 8 is an elevated perspective view of a preferred embodiment of the present invention illustrating the hide-away capability of the arm straps.

DESCRIPTION OF THE PREFERRED EMBODIMENTS

Figure 4:
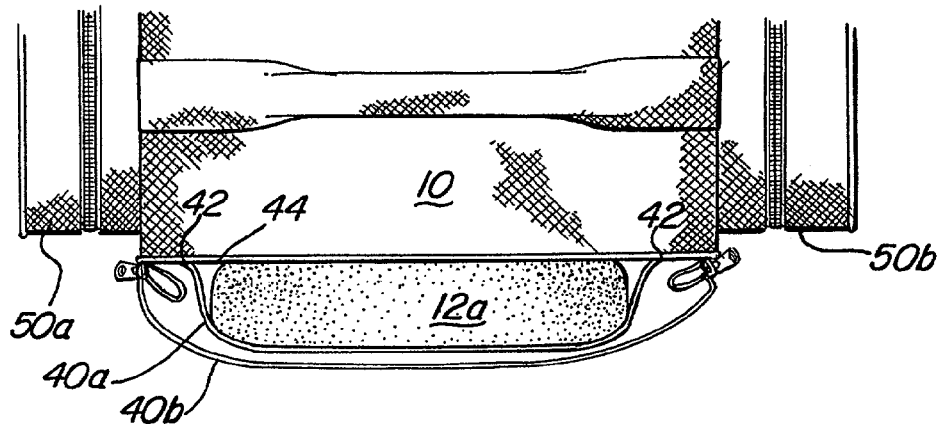
FIGS. 4, 5, and 6 are top views of a portion of a preferred embodiment of the present invention illustrating the adjustable enclosure adapting to various size sissy bars.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a motorcycle bag adapted to be secured to a variety of different sized motorcycles.

FIGS. 1 and 2 generally illustrate a preferred embodiment of the present invention, a motorcycle bag 10 adaptable to be secured to various sized motorcycle sissy bars 12. FIG. 1 illustrates a bag including a variable enclosure 14 having first and second open ends 16 to form a loop into which the sissy bar 12 passes through. In FIG. 2, the sissy bar 12 has passed through the variable enclosure 14 in a snug fashion to securely mount the motorcycle bag 10 of the present invention to the motorcycle 18. Lacing or cords 20 connected to a lower portion of the motorcycle bag 10 may be used to tie the motorcycle bag to the frame 22 of the sissy bar, the motorcycle turn signals 24, or other convenient anchor if needed (see FIG. 7).

FIGS. 2 and 3 demonstrate the feature of the preferred embodiment wherein a protective covering 26 is connected to the motorcycle bag 10 by a provided tether 28 within a storage compartment 30. When not in use, the protective covering 26 is securely stored and hidden from view within the storage compartment 30. When called upon, the protective covering 26 is withdrawn from the storage compartment 30 and placed over the motorcycle bag 10 to provide a water and wind resistant shell over the motorcycle bag. An elastic band or drawstring (not shown) is preferably located within a seam 32 at the opening 34 of the protective covering 26 to releasably secure the protective covering 26 to the motorcycle bag 10 by closing the opening 34 of the covering 26. Because the protective covering 26 is tethered to the motorcycle bag 10, there is no danger that the protective covering 26 will be lost or separated from the motorcycle bag 10.

Figure 5:
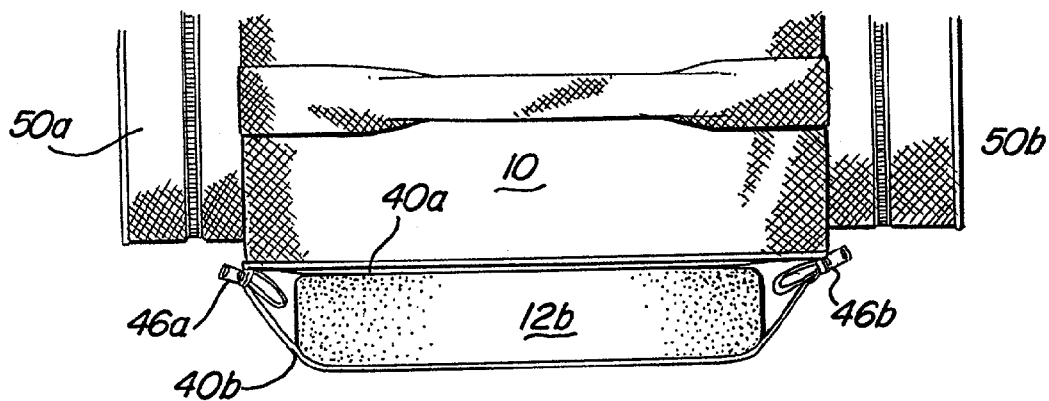
Figure 6:
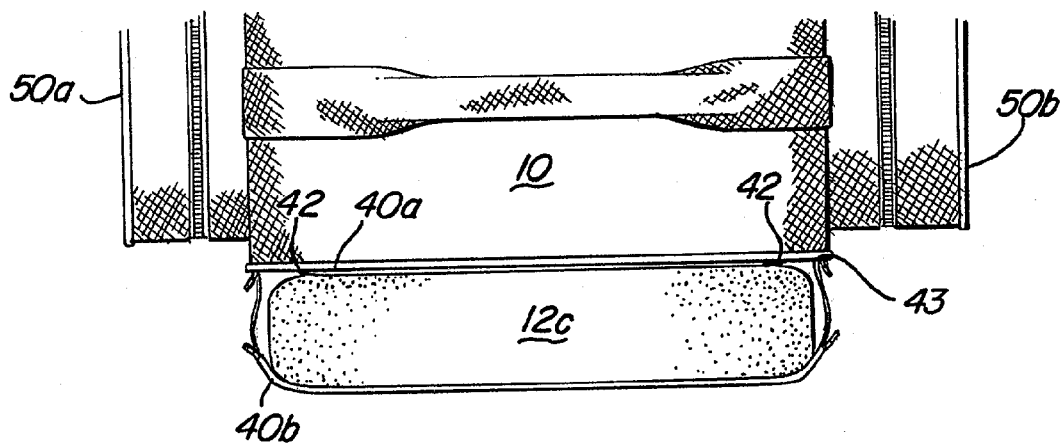

FIGS. 4-6 demonstrate an adjustable enclosure embodiment of the present invention, wherein the motorcycle bag 10 securely accommodates at least three motorcycle sissy bars 12a, 12b and 12c (or equivalent mounting structures) of varying width. A preferred embodiment of the adjustable enclosure comprises a series of layered panels 40a, 40b of varying length. The first panel 40a is fixed at first and second ends 42 of the motorcycle bag 10 to cooperate with the rear surface 44 of the motorcycle bag 10 to form a closed loop of a fixed size. The size of the closed loop defined by the first panel 40a and the back 44 of the motorcycle bag is determined by the length of the first panel 40a, and by the location of the fixed ends 42. In FIG. 4, the smallest of the illustrated motorcycle sissy bars 12a fits between the first panel 40a and the rear surface 44 to tightly mount the motorcycle bag 10 to the sissy bar 12a. In FIG. 6, the sissy bar 12c is secured between the first panel 40a and a larger, second panel 40b fixed substantially at the first and second ends 42 of the motorcycle bag 10. Because the second panel 40b is larger than the first panel 40a, it can accommodate a larger sissy bar 12c as shown in FIG. 6.

The second panel 40b can be shortened by releasable closure means such as a zipper 46a, 46b on each side of the second panel 40b as shown in FIG. 5. In this intermediate condition with the zippers 46a, 46b zipped, the closed loop between the first panel 40a and the second panel 40b is reduced. The sissy bar 12b still resides between the first and second panels 40a, 40b and the closed, or zipped configuration provides more space than the arrangement in FIG. 4, but obviously less space than the open or unzipped configuration of FIG. 6. For simplicity, the two zippers 46a, 46b can be replaced with a single zipper, and alternatively zipping only one of the two zippers 46a, 46b provides a fourth size. As such, four distinctly different sized sissy bars are accommodated with a single adjustable enclosure of the present invention. By layering additional panels in a similar manner, more sizes can be implemented into the invention.

FIG. 7 illustrates an organizer feature of a preferred embodiment of the present invention. A fold down flap 52 that includes a zipper 54 around a peripheral edge exposes a series of pockets 56 and compartments 58 for storing various items such as eye glasses, pens, maps, organizers, keys, and so forth. A calculator can be held in one compartment 58, or a PDA or eyeglass case. A latch 60 is provided to hold a key ring. The motorcycle bag 10 includes a pair of side compartments 50a, 50b for storing the protective covering as well as longer items such as an umbrella, a pair of shoes, a flashlight, or a set of tools.

FIG. 8 demonstrates a hide-away set of arm straps 64 or bands to carry the motorcycle bag 10 when not riding a motorcycle. That is, the motorcycle bag 10 can be converted to a traditional backpack by withdrawing a pair of arm straps 64 from a specially designed compartment 66 that contains the arm straps 64 when not in use. The arm straps 64 preferably include a connection device to connect the arm straps 64 to the bottom portion 68 of the motorcycle bag 10, such as the clip and loop combination 70 shown in FIG. 8. Buckles, snaps, hooks, and various other releasable connection devices are also possible connection devices for securing the arm straps 64 to the motorcycle bag. When the arm straps 64 are no longer used, the clip and loop combination 70 are unhooked and the free end 72 of the arm straps 64 are folded and stored in the designated compartment 66 until they are needed again. In this way, the motorcycle bag 10 of the present invention converts quickly and efficiently into a backpack for conventional carrying.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A bag attachable to a variety of different sized motorcycle back rests that vary in width and length by an attachment system permanently fastened to the bag, said attachment system comprising:
   a panel on one side of the bag, the panel having a top, a bottom, a first end fastened to the bag, and a second end fastened to the bag, the panel and the bag defining a closed loop containing a space adapted to fit over a motorcycle back rest; and
   a releasable closure mechanism on the panel extending from the top to the bottom of the panel, the closure mechanism reducing the closed loop when closed;
   whereby the panel has a front surface extending between the first end and the second end, and the front surface has a width greater than the width of the bag between the first and second ends, and the front surface fits over a back rest of a first size when the closure mechanism is closed and the panel fits over a back rest of a second larger size when the closure mechanism is open, wherein there is no bag on the other side of the closed loop.

2. The motorcycle bag of claim 1 wherein the releasable closure mechanism comprises a plurality of independently releasable closure mechanisms.

3. The motorcycle bag of claim 1 wherein the releasable closure mechanism comprises a zipper.

4. The motorcycle bag of claim 2 wherein the plurality of releasable closure mechanisms comprise zippers.

5. The motorcycle bag of claim 1 further comprising a pair of laces for tying the motorcycle bag to a component of the motorcycle.

6. The motorcycle bag of claim 1 further comprising:
   a covering having an opening sized to fit snugly over the motorcycle bag;
   a compartment on the motorcycle bag for concealing the covering when not in use; and
   a tether connecting the covering to the inside of the compartment.

7. The motorcycle bag of claim 6 wherein the covering includes means for releasably contracting the opening of the covering.

8. A bag attachable to a variety of different sized motorcycle back rests that vary in width and length by an attachment system permanently fastened to the bag, said attachment system comprising:
   a panel on one side of the bag, the panel having a top, a bottom, a first end fastened to the bag, and a second end fastened to the bag, the panel and the bag defining a closed loop containing a space adapted to fit over a motorcycle back rest;
   a releasable closure mechanism on the panel extending from the top to the bottom of the panel, the closure mechanism reducing the closed loop when closed;
   a covering having an opening sized to fit snugly over the motorcycle bag;
   a compartment on the motorcycle bag for concealing the covering when not in use;
   a tether connecting the covering to the inside of the compartment; and
   a pair of arm straps releasably connectable to the motorcycle bag, said arm straps storable in a compartment on said motorcycle bag when not in use;

whereby the panel fits over a back rest of a first size when the closure mechanism is closed and the panel fits over a back rest of a second larger size when the closure mechanism is open, wherein there is no bag on the other side of the closed loop.

9. The motorcycle bag of claim 8 further comprising an organizer including separate compartments for writing instruments, documents, and a compartment for holding a calculator, and a latch for holding a key ring.

10. A bag attachable to a variety of different sized motorcycle back rests that vary in width and length, the bag comprising:
   a bag body having an openable and closable internal compartment configured for storing items;
   an adjustable attachment system secured to the bag body, the adjustable attachment system being configured to allow the bag body to be secured to a variety of different sized motorcycle back rests that vary at least in width, the adjustable attachment system comprising:
      at least one panel of material secured to an exterior portion of the bag body, the at least one panel of pliable material having a first end and a second end, the first and second ends of the at least one panel of pliable material being secured to the bag body, the at least one panel of pliable material further comprising at least one upper edge and at least one lower edge, at least portions of the at least one upper edge and at least one lower edge being free, the at least one panel of pliable material thereby forming at least a portion of a closed loop, wherein the at least one panel has a front surface extending between the first end and the second end, and the front surface has a width greater than the width of the bag between the first and second ends, and the front surface is sized such that the closed loop can be fit over a backrest of a motorcycle such that the backrest extends through the at least one upper free edge and the at least one lower free edge, wherein there is no other bag body attached to the at least one panel of pliable material; and
   a pliable panel tightening mechanism configured to change the circumferential length of the at least one panel of pliable material so as to allow the closed loop to be tightened around a motorcycle back rest, the pliable panel tightening mechanism being configured to act on the at least one panel of pliable material to, in a first state of the pliable panel tightening mechanism, allow the closed loop to take a first circumferential size and to, in a second state of the pliable panel tightening mechanism, allow the closed loop to take a second circumferential size in which the maximum circumferential size of the closed loop is limited to a size that is smaller than the first circumferential size;
   whereby the closed loop tightly fits over a motorcycle backrest of a first size when the pliable panel tightening mechanism is in the first state thereby allowing the bag to be securely attached to a first size backrest of a motorcycle and whereby the closed loop tightly fits over a backrest of a second smaller size when the pliable panel tightening mechanism is in the second state, thereby allowing the bag to be securely attached to a second size backrest of a motorcycle, the second size backrest being smaller than the first size backrest.

* * * * *